United States Patent
Cho et al.

(10) Patent No.: US 11,804,892 B2
(45) Date of Patent: Oct. 31, 2023

(54) DISTRIBUTED ANTENNA SYSTEM WITH HYBRID SIGNAL SOURCES

(71) Applicants: TJ INNOVATION Co., Ltd., Bucheon-si (KR); Young Man Cho, Warrenton, VA (US)

(72) Inventors: Young Man Cho, Warrenton, VA (US); Gwangjae Jang, Bucheon-si (KR); Judong Lee, Seoul (KR); Jinkyu Lee, Bucheon-si (KR); Taeyoul Park, Bucheon-si (KR); Jinsil Park, Bucheon-si (KR); Duckyoung Park, Incheon (KR); Youngchul Baek, Seoul (KR)

(73) Assignee: TJ INNOVATION Co., Ltd., Bucheon-si (KR)

( * ) Notice: Subject to any disclaimer, the term of this patent is extended or adjusted under 35 U.S.C. 154(b) by 7 days.

(21) Appl. No.: 17/552,370

(22) Filed: Dec. 16, 2021

(65) Prior Publication Data

US 2023/0114802 A1    Apr. 13, 2023

Related U.S. Application Data

(60) Provisional application No. 63/253,535, filed on Oct. 7, 2021.

(51) Int. Cl.
| | | |
|---|---|---|
| *H04B 7/155* | (2006.01) | |
| *H04L 12/10* | (2006.01) | |
| *H04J 1/10* | (2006.01) | |

(52) U.S. Cl.
CPC ............... *H04B 7/155* (2013.01); *H04J 1/10* (2013.01); *H04L 12/10* (2013.01)

(58) Field of Classification Search
CPC ............. H04B 7/155; H04J 1/10; H04L 12/10
See application file for complete search history.

(56) References Cited

U.S. PATENT DOCUMENTS

| | | | | |
|---|---|---|---|---|
| 2001/0014104 A1* | 8/2001 | Bottorff | .............. | H04L 12/4604 370/537 |
| 2001/0035844 A1* | 11/2001 | Reece | ................... | H01Q 21/062 343/810 |

(Continued)

FOREIGN PATENT DOCUMENTS

| | | |
|---|---|---|
| KR | 10-2010-0063448 A | 6/2010 |
| KR | 10-2018-0125730 A | 11/2018 |
| KR | 10-2020-0005473 A | 1/2020 |

OTHER PUBLICATIONS

Non-final Office Action dated Mar. 24, 2023 from the Korean Intellectual Property Office for Korean Application No. 10-2021-0180796.

*Primary Examiner* — Stephen J Clawson
(74) *Attorney, Agent, or Firm* — INSIGHT LAW GROUP, PLLC; Seung Lee

(57) ABSTRACT

Disclosed is an in-building distributed repeater technique for distributing a wireless mobile communication signal into a building. Mobile communication signals of service carriers in communication between devices of an in-building distributed repeater system may be converted into intermediate frequency (IF) signals with adjacent frequency bands and may be transmitted or received as analog signals with compressed bandwidths through frequency division multiplexing. The service band gap spacing of Tx downstream analog IF signals transmitted by a headend unit to a remote service unit is wider than that of Rx downstream analog IF signals received from an active antenna unit.

18 Claims, 6 Drawing Sheets

(56) References Cited

U.S. PATENT DOCUMENTS

| | | | |
|---|---|---|---|
| 2004/0156399 A1* | 8/2004 | Eran | H04J 13/0048 370/395.5 |
| 2004/0201931 A1* | 10/2004 | Korcharz | H02J 9/061 361/18 |
| 2013/0077466 A1* | 3/2013 | Takaoka | H04L 5/0041 370/210 |
| 2018/0092102 A1* | 3/2018 | Pefkianakis | H04B 7/0452 |
| 2021/0044347 A1* | 2/2021 | Dussmann | H04W 72/23 |
| 2022/0225152 A1* | 7/2022 | Schultz | H04W 72/0453 |

* cited by examiner

FIG. 3

| | RF FREQ | | IF FREQ @AAU | | IF FREQ @SU | | BW |
|---|---|---|---|---|---|---|---|
| Band | DOWNSTREAM | UPSTREAM | DL | UL | DL | UL | |
| 800M | 862 - 894 | 817 - 849 | 20 - 52 | 90-122 | 65 - 97 | 10 - 45 | 32 |
| 1.9G | 1930 - 1995 | 1850 - 1915 | 230 - 300 | 330 - 400 | 95 - 160 | 10 - 75 | 65 |
| 2.1G | 2110 - 2180 | 1710 - 1780 | 150 - 220 | 430 - 500 | 100 - 170 | 10 - 80 | 70 |

DISTRIBUTED ANTENNA SYSTEM WITH HYBRID SIGNAL SOURCES

CROSS-REFERENCE TO RELATED APPLICATION(S)

This application claims priority from U.S. Provisional Application No. 63/253,535, filed on Oct. 7, 2021, the entire contents of which are incorporated herein by reference.

BACKGROUND

1. Field

The following description relates to a mobile communication technique, and particularly to, an in-building distributed repeater technique for distributing a wireless mobile communication signal into a building.

2. Description of Related Art

A digital-type distributed repeater that receives a wireless mobile communication signal transmitted from a mobile communication base station using an antenna and retransmits the signal into a building is known. The distributed repeater demodulates the signal received from an antenna unit, converts the signal into a digital signal, and transmits the digital signal to a remote service unit, and the remote service unit modulates and transmits the digital signal. There is convenience in construction by connecting a headend unit and a remote service unit using an Ethernet cable. However, a plurality of installed remote service units include a modulation/demodulation circuit to perform demodulation to baseband signals, thus increasing the price.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a distributed repeater system that allows connection through an Ethernet cable with a reduced price by simplifying the configuration of a remote service unit.

Also, the following description relates to a new structure of a distributed repeater system that can be fabricated using cheap components.

Also, the following description relates to an economical distributed repeater system that is easy to construct.

According to an aspect of the proposed invention, mobile communication signals of mobile communication service carriers in communication between devices of an in-building distributed repeater system are converted into analog intermediate frequency (IF) signals obtained through frequency shifting to lower bands, and then the analog IF signals are transmitted and received.

According to another aspect, a headend unit and a remote service unit may transmit and receive a plurality of analog IF signals by service band through a plurality of wire pairs of an Ethernet cable.

According to still another aspect, a headend unit and an active antenna unit may transmit and receive one analog IF signal generated by frequency-division-multiplexing service-band-wise analog IF signals.

According to yet another aspect, mobile communication signals of service carriers in communication between an active antenna unit and a headend unit in an in-building distributed repeater system may be converted into IF signals with adjacent frequency bands, and the IF signals may be transmitted and received as analog signals with compressed bandwidths through frequency division multiplexing.

According to an additional aspect, the band gap spacing of the plurality of analog IF signals transmitted by the headend unit to the remote service unit may be wider than the band gap spacing of service-band-wise IF signals of the Rx downstream analog IF signal received from the active antenna unit.

Furthermore, the band gap spacing of the service-band-wise IF signals of the Tx upstream analog IF signal transmitted to the active antenna unit may be wider than the band gap spacing of the plurality of analog IF signals received from the remote service unit.

According to an additional aspect, the headend unit may frequency-division-multiplex some of the output downstream IF signals and transmit the frequency-division-multiplexed signals through one wire pair of an Ethernet port.

According to an additional aspect, the remote service unit may receive power from the headend unit through an Ethernet cable without a separate power cable.

In addition, the active antenna unit may receive power from the headend unit through a communication cable without a separate power cable.

According to an additional aspect, the headend unit may manage multiple remote service units connected through Ethernet cables through a standard terminal management protocol.

Other features and aspects will be apparent from the following detailed description, the drawings, and the claims.

BRIEF DESCRIPTION OF THE DRAWINGS

FIG. 3 is a table listing frequency bands by mobile communication carriers in North America.

Figure 1:
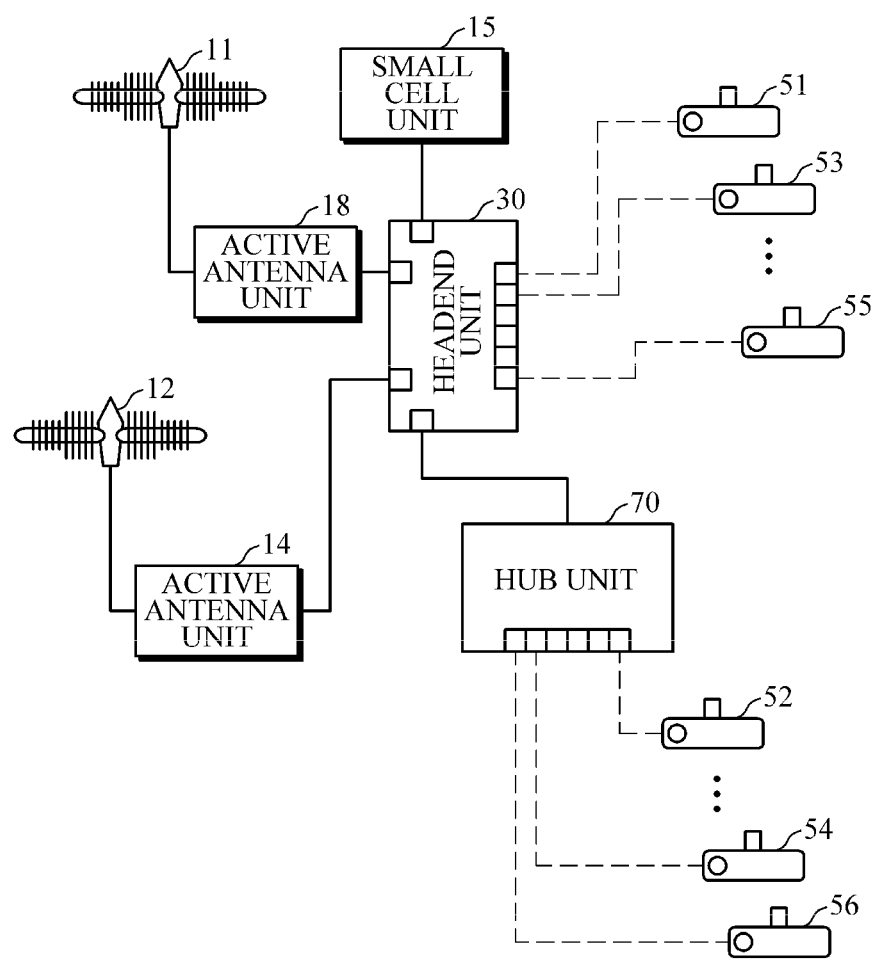
FIG. 1 shows the configuration of an in-building distributed repeater system according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and additional aspects are embodied through embodiments to be described with reference to the accompanying drawings. It is to be understood that the components of each embodiment may be variously combined therein unless otherwise stated or mutually contradictory. In some cases, each block of a block diagram may represent a physical component. In other cases, each block may logically represent a partial function of a single physical component or a common function of a plurality of physical components. Sometimes, actually, a block or a part thereof may be a set of program instructions. Some or all of the blocks may be implemented in hardware, software, or a combination thereof.

FIG. 1 shows the configuration of an in-building distributed repeater system according to an embodiment. As shown, an in-building distributed repeater system includes an antenna 11, an active antenna unit 13, a headend unit 30, and multiple remote service units 51, 53, and 55. The antenna 11 is fastened to one side of the active antenna unit. For example, the active antenna unit may be fixedly installed on a wall with an anchor or installed on a column through a bracket. The headend unit 30 is manufactured in the form of an enclosure with a heat dissipation fan formed outside and is installed inside a protective cabinet when installed outdoors. The multiple remote service units 51, 53, and 55 are installed in a space where subscribers who use mobile communication terminals are active. Remote service units 52, 54, and 56 may be additionally connected to the headend unit 30 through a hub unit 70.

In the shown embodiment, the active antenna unit 13 and the headend unit 30 are connected by a coaxial cable. Also, the plurality of service units 51, 53, and 55 and the headend unit 30 may be connected by an Ethernet cable, for example, a CAT6a cable. The hub unit 70 and the headend unit 30 may be connected by an optical cable.

As an example, the antenna 11 and the active antenna unit 13 may be installed on the roof of a building, and the headend unit 30 may be installed in the basement. The multiple remote service units 51, 53, and 55 may be installed on each floor and in each room of the basement. As another example, the antenna 11, the active antenna unit 13, and the headend unit 30 may be installed on the roof of a building. The multiple remote service units 51, 53, and 55 may be installed on each floor and in each room of the building.

The active antenna unit 13 transmits and receives a wireless mobile communication signal to and from a mobile communication base station through the antenna 11. Since each carrier uses a different band through a different system, the active antenna unit 13 transmits and receives wireless mobile communication signals of a plurality of bands of a plurality of carriers.

According to an aspect, the active antenna unit 13 performs intermediate frequency modulation and multiplexing on the wireless signals received from the antenna 11 by carrier service band and transmits the wireless signals to the headend unit 30. The active antenna unit 13 filters, conditions, multiplexes, amplifies, and transmits service band signals by band. Accordingly, the active antenna unit 13 and the headend unit 30 may use a thin cheap coaxial cable that has attenuation but that is easy to construct instead of a ½-inch coaxial cable that is typically used but that is inconvenient to construct.

The headend unit 30 converts an analog intermediate frequency (IF) signal transmitted and received between the active antenna unit 13 and the multiple remote service units 51, 53, and 55 into a digital signal to perform digital signal processing and then relays the signal. In the shown embodiment, an additional active antenna unit 14 is connected to the headend unit 30. For example, the active antenna unit 13 may be installed on the right side of the roof of a building toward a base station on the right side, and the active antenna unit 14 may be installed on the left side of the roof of the building toward a base station on the left side. The headend unit 30 may internally check the quality of wireless signals for each service carrier received from the two active antenna units 13 and 14, select the better one between the two signals, and relay the selected signal.

Each of the remote service units 51, 53, and 55 modulates the analog IF signal received from the headend unit 30 to convert the signal into a wireless mobile communication signal that can be received by mobile communication terminals, transmits the wireless mobile communication signal through the antenna, performs intermediate frequency demodulation on the wireless mobile communication signal received from the antenna, and transmits the signal to the headend unit 30 in the form of an analog IF signal.

Meanwhile, one or more small cell units 15 may be additionally connected to the headend unit 30. If a service carrier's base station is not nearby or the service quality is poor, the service carrier may install a small cell. A small cell unit 15 may be added to the headend unit 30 to support such changes in operating conditions or environmental limitations. The headend unit 30 may internally check the quality of service supported by the small cell unit 14 and the quality of wireless signals for each service carrier received from the two active antenna units 13 and 14, select the better one between the two signals, and relay the selected signal.

Figure 2:
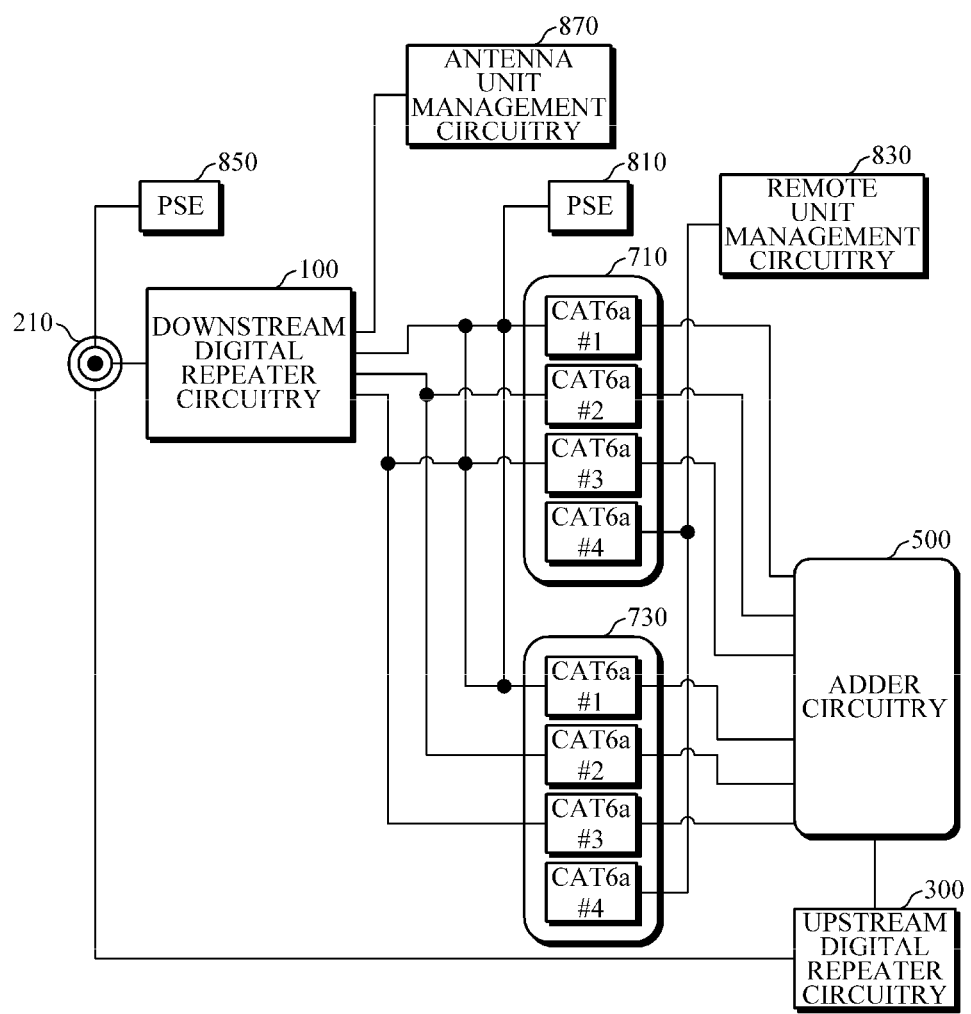
FIG. 2 is a block diagram showing the configuration of a headend unit according to an embodiment.

FIG. 2 is a block diagram showing the configuration of the headend unit according to an embodiment. The headend unit according to an embodiment includes a downstream digital repeater circuitry 100, an adder circuitry 500, and an upstream digital repeater circuitry 300. The headend unit includes a plurality of Ethernet ports 710 and 730 for connecting to multiple remote service units. Although only two Ethernet ports are shown for convenience of illustration, an actually designed embodiment includes eight ports. Here, although the ports are called Ethernet ports, transmitted and received analog signals do not need to have the form of an Ethernet packet as long as an Ethernet port and cable are physically used. The present invention is not limited thereto.

The downstream digital repeater circuitry 100 distributes, to the remote service units, at least one Tx downstream analog IF frequency signal generated by performing digital signal processing for each service band on an Rx downstream analog IF signal input from an active antenna unit. According to an aspect, the headend unit and the plurality of remote service units may transmit and receive signals in a full-duplex manner through one wire pair of an Ethernet cable. In an embodiment, the active antenna unit and the headend unit are connected by a coaxial cable. The headend unit and the plurality of remote service units are connected by Cat6a UTP cables. The Cat6a cable includes four pairs of eight wires. In an embodiment, the headend unit and the plurality of remote service units transmit and receive analog IF signals through three wire pairs among the four pairs of eight wires. In the shown embodiment, the headend unit transmits and receives analog IF signals through wire pairs #1, #2, and #3 of the CAT6a cable.

The downstream digital repeater circuitries 100 samples the Rx downstream analog IF frequency signal received from the active antenna unit through the coaxial cable 210, converts the sampled signal into a digital signal, and distributes a transmitted downstream analog intermediate signal generated by performing digital signal processing for each service band to the remote service units through the multiple Ethernet ports 710 and 730. In an embodiment, the digital signal processing is implemented by a field-programmable gate array (FPGA), and it is possible to improve signal relay quality through digital filtering and an interference cancellation system (ICS). Some or all of the band-wise signals processed by service band may be frequency-division-multiplexed and converted into analog signals and may be distributed through one wire pair of each of the multiple Ethernet ports. As another example, the band-wise signals processed by service band may be converted into analog IF signals and distributed through different wire pairs of each of the multiple Ethernet ports. In any case, the same Tx downstream analog IF signal is transmitted to all of the remote service units via one or a plurality of wire pairs.

The adder circuitry 500 adds up Rx upstream analog IF signals received from the multiple remote service units. Unlike a Tx signal, signals transmitted by the remote service units, that is, Rx upstream analog IF signals, are different for each remote service unit. In an embodiment, analog IF signals transmitted by the remote service units may be signals obtained by frequency-division-multiplexing IF signals of a plurality of service bands. As another example, the remote service units may divisionally transmit service-band-wise analog IF signals through a plurality of wire pairs of the Ethernet cable.

In the shown embodiment, the adder circuitry 500 adds an analog IF signal received through wire pair #1 of the CAT6a cable of the Ethernet port 710 and an analog IF signal received through wire pair #1 of the CAT6a cable of the Ethernet port 730. Also, the adder circuitry 500 adds an analog IF signal received through wire pair #2 of the CAT6a cable of the Ethernet port 710 and an analog IF signal received through wire pair #2 of the CAT6a cable of the Ethernet port 730. Also, the adder circuitry 500 adds an analog IF signal received through wire pair #3 of the CAT6a cable of the Ethernet port 710 and an analog IF signal received through wire pair #3 of the CAT6a cable of the Ethernet port 730. As is known in the field of distributed repeaters, mobile communication signals received from remote service units may be distinguished at a base station even if the signals are combined through simple addition.

The upstream digital repeater circuitry 300 outputs one Tx upstream analog IF signal generated by performing digital signal processing for each service band on the added RX upstream analog IF signal.

FIG. 3 is a table listing frequency bands by mobile communication service providers in North America. In the proposed invention, a service for three bands shown in FIG. 3 will be described as an example. Here, the service bandwidth (BW) of an 800 MHz band carrier is 32 MHz, the service bandwidth of a 1.9 GHz band carrier is 65 MHz, and the service bandwidth of a 2.1 GHz band carrier is 70 MHz. The service bands RF FREQ of these carriers are sufficiently spaced apart. According to an aspect of the proposed invention, mobile communication signals of service carriers in communication between devices of an in-building distributed repeater system may be converted into IF signals with adjacent frequency bands and may be transmitted or received as analog signals with compressed bandwidths through frequency division multiplexing.

Figure 4:
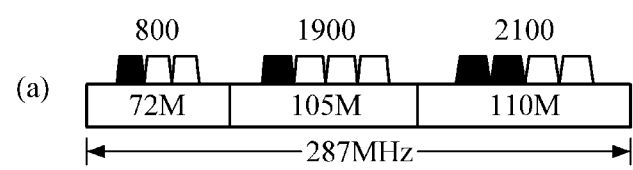
FIG. 4 shows example analog signals compressed through frequency division multiplexing.
Figure 4:
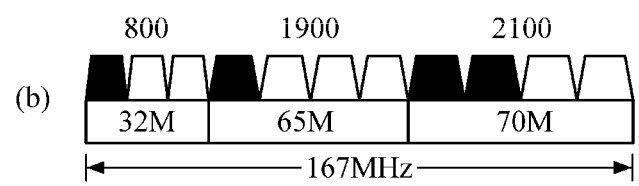

FIG. 4 shows example analog signals converted into IF signals with adjacent frequency bands and compressed through frequency division multiplexing. For example, as shown in FIG. 3, actually, the frequency of 1.9 GHz band signals is at least twice the frequency of 800 MHz band signals. However, in the proposed invention, when an active antenna unit transmits the signals to a headend unit, the signals may be frequency-shifted such that the signals are adjacent to one another on a frequency axis as shown in FIG. 4B. On the other hand, signals in frequency bands lower than that of a mobile communication signal for each service carrier, e.g., 100 MHz band signals, may be used as frequency-division-multiplexed IF signals. In FIG. 3, IF FREQ @AAU illustrates service band frequencies (MHz) of analog IF signals transmitted and received by the headend unit and the active antenna unit. Also, IF FREQ @SU illustrates service band frequencies (MHz) of analog IF signals transmitted and received by the headend unit and the remote service unit. The analog IF signals that are transmitted and received by the headend unit to and from the active antenna unit through a coaxial cable have a bandwidth of 600 MHz or less. The analog IF signals that are transmitted and received by the headend unit to and from the remote service unit are signals within the range of 0 to 200 MHz for each service band.

For example, in FIG. 4B, the IF signal band of 800 MHz may use 100 to 132 MHz. Accordingly, devices of an in-building distributed repeater system according to an aspect of the proposed invention may transmit and receive wireless communication signals of carriers through a coaxial cable or, in particular, a cable with a very limited bandwidth, such as an unshielded twisted pair (UTP) cable.

That is, the active antenna unit receives wireless mobile communication signals transmitted by service-carrier-wise base stations from an antenna, modulates demodulated service-carrier-wise baseband signals, frequency-shifts the baseband signals into a frequency band shown in FIG. 4A, generates service-carrier-wise IF signals, adds up the IF signals, frequency-division-multiplexes the IF signals by service band, and transmits the frequency-division-multiplexed signals to the headend unit. Similarly, each remote service unit receives wireless mobile communication signals received from mobile communication terminals from an antenna, modulates demodulated service-carrier-wise baseband signals, frequency-shifts the baseband signals into a frequency band shown in FIG. 4A, generates service-carrier-wise IF signals, adds up the IF signals, frequency-division-multiplexes the IF signals by service band, and transmits the frequency-division-multiplexed signals to the headend unit.

The applicants' experiments have shown that the signal transmission attenuation of a Cat6a cable increases rapidly as the bandwidth exceeds 200 MHz. Accordingly, as shown in FIG. 4A, a signal with a bandwidth of 287 MHz is not suitable for transmission and reception between the headend unit and the remote service unit through a single wire pair of the Cat6a cable.

According to an additional aspect, the headend unit may distribute Tx downstream analog IF signals to the remote service units and may divide and distribute a plurality of analog IF signals processed by service band through each wire pair of the Ethernet cable. Among the Tx downstream analog IF signals shown in FIG. 4A, divisional Tx downstream analog IF signals with a band of 72 MHz of an 800 MHz service carrier are distributed to wire pair #1 of the Ethernet port 710 and wire pair #1 of the Ethernet port 730 as shown in FIG. 2. Also, divisional Tx downstream analog IF signals with a band of 105 MHz of a 1.9 GHz service carrier are distributed to wire pair #2 of the Ethernet port 710 and wire pair #2 of the Ethernet port 730. Also, divisional Tx downstream analog IF signals with a band of 110 MHz of a 2.1 GHz service carrier are distributed to wire pair #3 of the Ethernet port 710 and wire pair #3 of the Ethernet port 730.

According to an additional aspect, the band gap spacing of the plurality of analog IF signals transmitted by the headend unit to the remote service unit may be wider than the band gap spacing of service-band-wise IF signals of the Rx downstream analog IF signal received from the active antenna unit. FIG. 4A shows an example of the frequency band arrangement of a plurality of analog IF signals transmitted by the headend unit to the remote service unit. The service band gap spacing of the analog IF signals transmitted by the headend unit is much wider than the service band gap spacing of the Rx downstream analog IF signals, which are shown in FIG. 4B, received by the headend unit from the active antenna unit. For example, the bandwidth of actual data of the 800 MHz service band is 32 MHz, as shown in FIG. 4B, but a service band gap spacing of 20 MHz is added to both ends of the band. Accordingly, it is possible to reduce the burden of circuit specifications for Rx signal processing of a remote service unit that uses an analog bandpass filter.

According to an additional aspect, while adding up a plurality of Rx upstream analog IF signals received from remote service units, the headend unit may add up and output, by wire pair, a plurality of analog IF signals divisionally received through a plurality of wire pairs of each Ethernet cable by service band. The upstream digital repeater circuitry may generate and output one Tx upstream analog IF signal by frequency-division-multiplexing the service-band-wise analog IF signals output by the adder circuitry.

In the embodiment shown in FIG. 2, the adder circuitry 500 adds and outputs the analog IF signal with a band of 800 MHz received through wire pair #1 of the Ethernet port 710 and the analog IF signal with a band of 800 MHz received through wire pair #1 of the Ethernet port 730, adds and outputs the analog IF signal with a band of 1.9 GHz received through wire pair #2 of the Ethernet port 710 and the analog IF signal with a band of 1.9 GHz received through wire pair #2 of the Ethernet port 730, and adds and outputs the analog IF signal with a band of 2.1 GHz received through wire pair #3 of the Ethernet port 710 and the analog IF signal with a band of 2.1 GHz received through wire pair #3 of the Ethernet port 730. The upstream digital repeater circuitry 300 may generate and output one Tx upstream analog IF signal to a coaxial cable 210 by frequency-division-multiplexing the service-band-wise analog IF signals output by the adder circuitry.

According to an additional aspect, the band gap spacing of the frequency-division-multiplexed service-band-wise IF signals of the Tx upstream analog IF signal transmitted by the headend unit to the active antenna unit may be wider than the band gap spacing of a plurality of analog IF signals of different service bands of the Rx upstream analog IF signal received from the remote service unit. FIG. 4A may be an example of the arrangement in the frequency domain of Tx upstream analog IF signals transmitted by the headend unit to the active antenna unit. Similarly, FIG. 4B may be an example of the arrangement in the frequency domain of Rx upstream analog IF signals received by the headend unit from the remote service units. Here, the Tx upstream analog IF signal transmitted by the headend unit to the active antenna unit has a much wider service band gap spacing than the Rx upstream analog IF signal received by the headend unit from the remote service unit.

The size of the service band gap spacing may be set differently for each service provider band, for each Rx upstream analog IF signal, and for each Tx upstream analog IF signal. Accordingly, it is possible to reduce the burden of circuit specifications for Rx signal processing of an active antenna unit that uses an analog bandpass filter. A coaxial cable has a wider transmission bandwidth than a Cat6a Ethernet cable so that, for example, a signal with a band of 287 MHz shown in FIG. 4A may be transmitted and received through one cable.

According to an additional aspect, the remote service unit may receive power from the headend unit through an Ethernet cable without a separate power cable. In FIG. 2, the headend unit may further include a remote power sending circuitry 810. The IEEE 802.3a standard, also known as Power over Ethernet (PoE), is a technique for transmitting data and power together through a standard Category 5 UTP cable (Cat5 cable). A power sending entity (PSE) checks the specification of a powered device (PD) and transfers appropriate power. One PSE module may include a power transfer circuit to which the standard is applied, and may be configured to transfer appropriate power to multiple Ethernet terminals through multiple ports. A functional block denoted as PSE 810 in the drawing may be implemented as one PSE module having two outputs connected to respective Ethernet ports. In the shown example, the remote power sending circuitry 810 transfers power through wire pairs #1 through which Tx downstream analog IF signals are transmitted.

In addition, the active antenna unit may receive power from the headend unit through a coaxial cable without a separate power cable. In FIG. 2, the headend unit may further include an antenna power sending circuitry 850. Power over Coaxial (PoC) technology is a technology for transferring power through a coaxial cable in addition to an analog signal, and several technologies are known by each company. The antenna power sending circuitry 850 transfers power through an outer conductor of the coaxial cable through which the Tx upstream analog IF signals are transmitted.

According to an additional aspect, the headend unit may manage multiple remote service units connected through Ethernet cables through a standard terminal management protocol, for example, the Simple Network Management Protocol (SNMP). In the proposed invention, the remote service units and the headend unit transmit and receive analog IF signals independent of Ethernet. In the embodiment shown in FIG. 2, the headend unit includes a remote unit management circuitry 830. The remote unit management circuitry 830 may communicate with remote service units through wire pairs #4 of the Ethernet ports 710 and 730. In the shown embodiment, the remote unit management circuitry 830 communicates with the remote service units using a frequency-shift keying (FSK) modem. Thus, the remote unit management circuitry 830 may update the firmware of the remote service units or monitor the state of the remote service units.

In addition, the headend unit may manage one or a plurality of active antenna units connected through coaxial cables, through a standard terminal management protocol, for example, the Simple Network Management Protocol (SNMP). In the embodiment shown in FIG. 2, the headend unit includes an antenna unit management unit 870. The antenna unit management unit 870 may communicate with an active antenna unit through a coaxial cable. In the shown embodiment, the antenna unit management unit 870 communicates with an active antenna unit using a frequency-shift keying (FSK) modem. Thus, the antenna unit management unit 870 may update the firmware of the active antenna unit or monitor the state of the active antenna unit.

Figure 5:
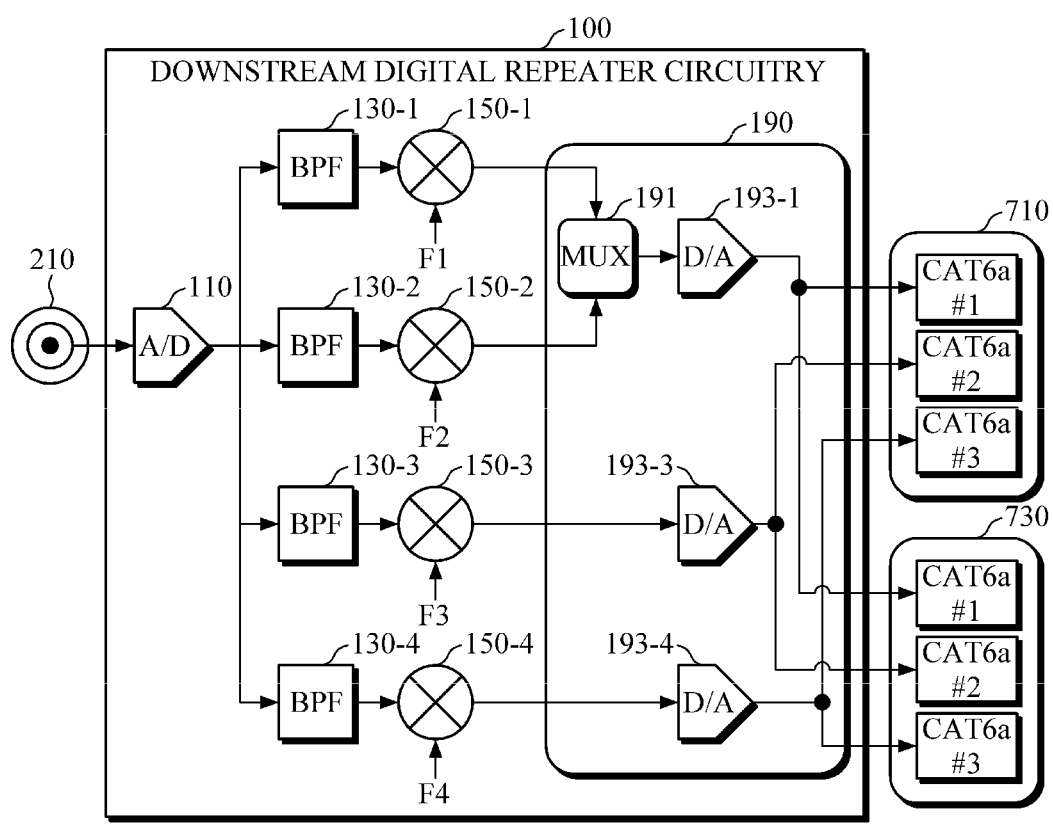
FIG. 5 is a block diagram showing an example configuration of a downstream digital repeater circuitry in the embodiment of FIG. 2.

FIG. 5 is a block diagram showing an example configuration of a downstream digital repeater circuitry in the embodiment of FIG. 2. The downstream digital repeater circuitry according to an embodiment will be described with reference to FIGS. 1, 2, and 5. As shown, the downstream digital repeater circuitry 100 according to an embodiment includes an analog-to-digital conversion circuitry 110, a plurality of downstream digital bandpass filters 130-1 to 130-4, a plurality of downstream IF shifting circuitries 150-1 to 150-4, and a signal distributing circuitry 190. The analog-to-digital conversion circuitry 110 samples an analog Rx downstream analog IF signal received through a coaxial connector and converts the sampled signal into a digital downstream signal. The sampling frequency may be determined according to the bandwidth of the Rx downstream analog IF signal transmitted by the active antenna unit.

The downstream digital bandpass filters 130-1 to 130-4 have a filtering characteristic determined according to a carrier-wise service bandwidth of the Rx downstream analog IF signal transmitted by the active antenna unit. For example, the downstream digital bandpass filter 130-4 may have a bandpass characteristic that allows passing only signals ranging from 150 MHz to 220 MHz, which are downstream IF signals with a band of 2.1 GHz in FIG. 3. Also, the downstream digital bandpass filter 130-3 may have a bandpass characteristic that allows passing only signals ranging from 230 MHz to 300 MHz, which are downstream IF signals with a band of 1.9 GHz in FIG. 3.

The downstream IF shifting circuitries 150-1 to 150-4 output digital downstream IF signals by frequency-shifting service-band-wise digital downstream signals output by corresponding downstream digital bandpass filters into signals in the Tx frequency range of the Ethernet cable. For example, the downstream IF shifting circuitry 150-4 frequency-shifts an input signal ranging from 150 MHz to 220 MHz to a signal ranging from 100 MHz to 170 MHz, which is the range of a Tx downstream IF signal with a band of 2.1 GHz in FIG. 3. Also, the downstream IF shifting circuitry 150-3 frequency-shifts an input signal ranging from 230 MHz to 300 MHz to a signal ranging from 95 MHz to 160 MHz, which is the range of a Tx downstream IF signal with a band of 1.9 GHz in FIG. 3.

The signal distributing circuitry 190 converts the digital downstream IF signals output by the plurality of downstream IF shifting circuitries 150-1 to 150-4 into analog signals and distributes the analog signals into Ethernet ports.

According to an additional aspect, the headend unit may frequency-division-multiplex some of the output downstream IF signals and transmit the frequency-division-multiplexed signals through one wire pair of the Ethernet port. In an embodiment, the signal distributing circuitry 190 includes a frequency division multiplexing circuitry 191. The frequency division multiplexing circuitry 191 frequency-division-multiplexes the two digital downstream IF signals output from the downstream IF shifting circuitries 150-1 and 150-2. The digital-to-analog conversion circuitry 193-1 converts the multiplexed digital downstream IF signal output by the frequency division multiplexing circuitry 191 into an analog signal and distributes the analog signal into first wire pairs #1 of the Ethernet ports 710 and 730. Meanwhile, the digital-to-analog conversion circuitry 193-3 converts the digital downstream IF signal output by the downstream IF shifting circuitry 150-3 into an analog signal and distributes the analog signal into second wire pairs #2 of the Ethernet ports 710 and 730. Also, the digital-to-analog conversion circuitry 193-4 converts the digital downstream IF signal output by the downstream IF shifting circuitry 150-4 into an analog signal and distributes the analog signal into third wire pairs #3 of the Ethernet ports 710 and 730.

Figure 6:
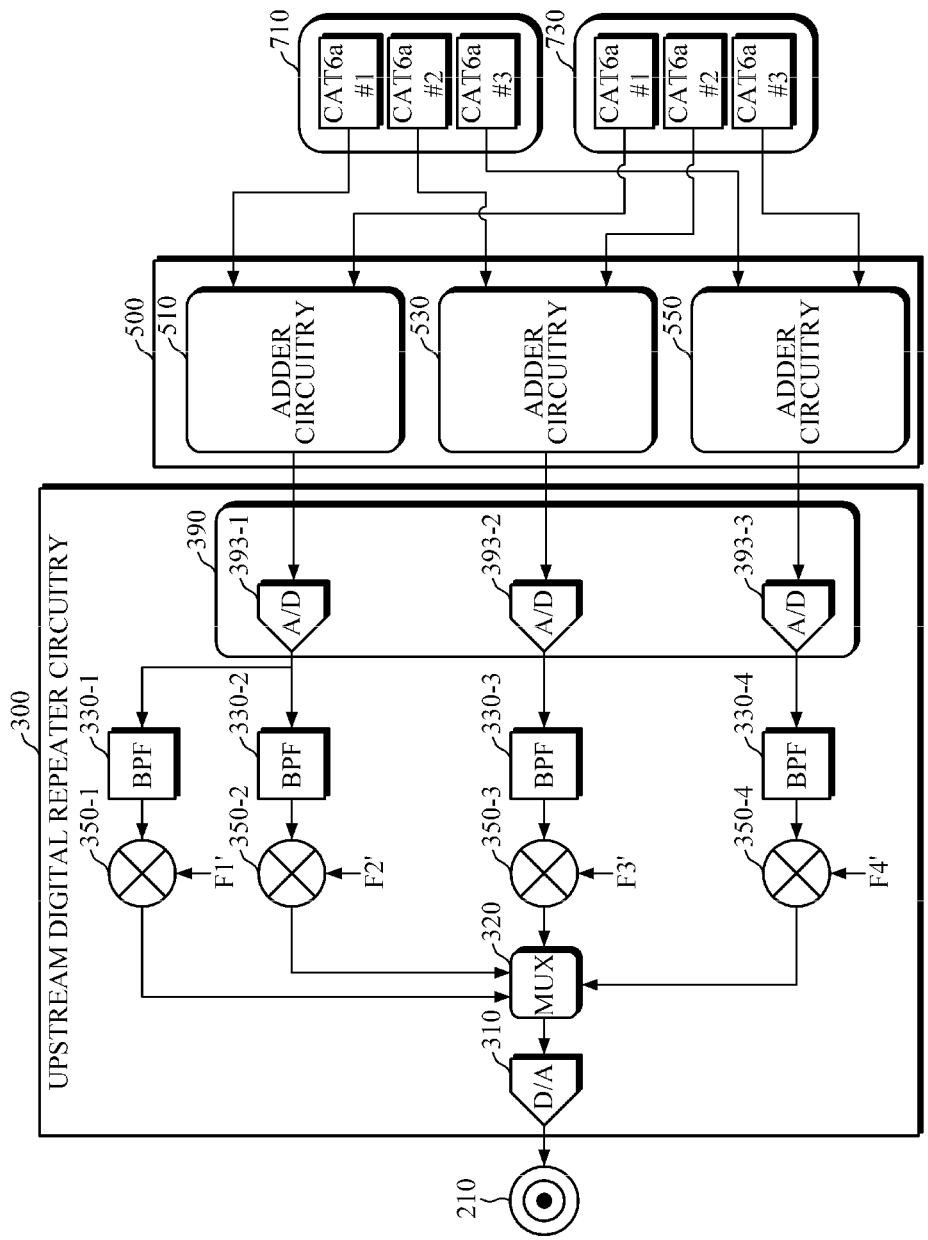
FIG. 6 is a block diagram showing an example configuration of an upstream digital repeater circuitry in the embodiment of FIG. 2.

FIG. 6 is a block diagram showing an example configuration of an upstream digital repeater circuitry in the embodiment of FIG. 2. The upstream digital repeater circuitry according to an embodiment will be described with reference to FIGS. 1, 2, and 6. As shown, the upstream digital repeater circuitry according to an embodiment includes an analog-to-digital conversion circuitry 390, a plurality of upstream digital bandpass filters 330-1 to 330-4, a plurality of upstream IF shifting circuitries 350-1 to 350-4, a multiplexing circuitry 320, and a digital-to-analog conversion circuitry 310.

The analog-to-digital conversion circuitry 390 converts an Rx upstream analog IF signal output by the adder circuitry 500 into a digital upstream signal. The sampling frequency may be determined according to the bandwidth of the Rx upstream analog IF signal transmitted by the remote service unit.

The plurality of upstream digital bandpass filters 330-1 to 330-4 filter the digital upstream signal by service band. The upstream digital bandpass filters have a filtering characteristic determined according to a carrier-wise service bandwidth of an Rx upstream analog IF signal transmitted by the remote service unit. For example, the upstream digital bandpass filter 330-4 may have a bandpass characteristic that allows passing only signals ranging from 10 MHz to 80 MHz which are upstream IF signals with a band of 2.1 GHz in FIG. 3. Also, the upstream digital bandpass filter 330-3 may have a bandpass characteristic that allows passing only signals ranging from 10 MHz to 75 MHz, which are upstream IF signals with a band of 1.9 GHz in FIG. 3.

The upstream IF shifting circuitries output digital upstream IF signals by frequency-shifting service-band-wise digital upstream signals output by corresponding upstream digital bandpass filters into signals in the Tx frequency range of the coaxial cable. For example, the upstream IF shifting circuitry 350-4 frequency-shifts an input signal ranging from 10 MHz to 80 MHz to a signal ranging from 430 MHz to 500 MHz, which is the range of a Tx upstream IF signal with a band of 2.1 GHz in FIG. 3. Also, the upstream IF shifting circuitry 350-3 frequency-shifts an input signal ranging from 10 MHz to 75 MHz to a signal ranging from 230 MHz to 300 MHz, which is the range of a Tx upstream IF signal with a band of 1.9 GHz in FIG. 3.

The multiplexing circuitry 320 frequency-division-multiplexes service-band-wise digital upstream IF signals and outputs a single digital upstream IF signal. The multiplexing circuitry 320 may perform multiplexing by simply adding up input signals because the plurality of upstream IF shifting circuitries 350-1 to 350-4 have shifted the input signal to an appropriate frequency band.

The digital-to-analog conversion circuitry 310 converts the frequency-division-multiplexed digital upstream IF signal into an analog signal and outputs the analog signal through a coaxial cable.

According to an additional aspect, the adder circuitry 500 may add up and output service-band-wise analog IF signals input through wire pairs of an Ethernet cable by service band. Signals in two service bands in which frequency bands do not overlap and which do not have wide bandwidths, for example, signals with a band of 700 MHz and signals with a band of 800 MHz, may be frequency-division-multiplexed and transmitted and received between a remote service unit and a headend unit. In the embodiment shown in FIG. 6, the adder circuitry 500 includes a first adder circuitry 510, a second adder circuitry 530, and a third adder circuitry 550. The first adder circuitry 510 adds and outputs an analog IF signal input from the first wire pair #1 of the first Ethernet port 710 and an analog IF signal input from the first wire pair #1 of the second Ethernet port 730. The second adder circuitry 530 adds and outputs an analog IF signal input from the second wire pair #2 of the first Ethernet port 710 and an analog IF signal input from the second wire pair #2 of the second Ethernet port 730. The third adder circuitry 550 adds and outputs an analog IF signal input from the third wire pair

3 of the first Ethernet port 710 and an analog IF signal input from the third wire pair #3 of the second Ethernet port 730.

In FIG. 6, a first analog-to-digital conversion circuitry 393-1 converts the output of the first adder circuitry 510 into a digital upstream signal. Also, a second analog-to-digital conversion circuitry 393-2 converts the output of the second adder circuitry 530 into a digital upstream signal, and a third analog-to-digital conversion circuitry 393-3 converts the output of the third adder circuitry 550 into a digital upstream signal.

In the shown embodiment, the output of the first analog-to-digital conversion circuitry 303-1 may be supplied in common to the first digital bandpass filter 330-1 and the second digital bandpass filter 330-2. The first digital bandpass filter 330-1 filters the output of the first analog-to-digital conversion circuitry into a first service band. The second digital bandpass filter 330-2 filters the output of the first analog-to-digital conversion circuitry into a second service band.

According to the proposed invention, low-frequency intermediate frequency (IF) signals are transmitted and received between an active antenna unit and a headend unit, and thus it is possible to lower the price of a system because cheap components for low frequencies can be used for an active antenna unit or a headend unit. Furthermore, according to the proposed invention, low-frequency IF signals are divisionally transmitted and received between a remote service unit and a headend unit through multiple wire pairs by service band, and thus it is possible to reduce the price of a system because cheap components for narrow bands can be used for an active antenna unit or a headend unit.

Furthermore, a head-end unit with a built-in digital signal processing circuit enables high-level signal processing, and an active antenna unit, and especially, a large number of remote service units, which are included in a system, are simply implemented only using an analog circuit, and thus it is possible to reduce the price of the system. By making the service band gap spacing of multiplexed IF signals transmitted by a headend unit with a built-in digital signal processing circuit wider than that of the received signals, it is possible to facilitate analog filtering of a received signal in the case of an active antenna unit that performs analog signal processing and especially a remote service unit. Thus, it is possible to reduce the burden on the specification of a receiving circuit, thereby enabling a lower cost implementation.

The present invention has been described above with reference to embodiments referring to the accompanying drawings, but is not limited thereto. Rather, the present invention should be construed as encompassing various modifications that may be apparent to those skilled in the art. The appended claims are intended to cover such modifications.

What is claimed is:

1. A headend unit of a mobile communication repeater system having one side connected to an active antenna unit and another side connected to multiple remote service units through an Ethernet cable, the headend unit comprising:
   a downstream digital repeater circuitry configured to distribute a Tx downstream analog intermediate frequency (IF) signal generated by performing digital signal processing for each service band on an Rx downstream analog IF signal input from the active antenna unit into the multiple remote service units;
   an adder circuitry configured to add up Rx upstream analog IF signals received from the multiple remote service units; and
   an upstream digital repeater circuitry configured to output one Tx upstream analog IF signal generated by performing digital signal processing for each service band on an output of the adder circuitry,
   wherein the downstream digital repeater circuitry divisionally distributes a plurality of analog IF signals processed for each service band through wire pairs of the Ethernet cable when distributing the Tx downstream analog IF signal into the multiple remote service units, and
   wherein the downstream digital repeater circuitry is configured to make a bandgap spacing of the plurality of analog IF signals wider than a bandgap spacing of a service-band-wise IF signal of the Rx downstream analog IF signal.

2. The headend unit of claim 1, wherein
   while adding up the Rx upstream analog IF signals, the adder circuitry adds up and outputs, by wire pair, a plurality of analog IF signals divisionally received through a plurality of wire pairs of each Ethernet cable by service band, and
   the upstream digital repeater circuitry generates one Tx upstream analog IF signal obtained by frequency-division-multiplexing the service-band-wise analog IF signals output by the adder circuitry.

3. The headend unit of claim 2, wherein the upstream digital repeater circuitry is configured to make a band gap spacing of the frequency-division-multiplexed service-band-wise IF signals of the Tx upstream analog IF signal wider than a band gap spacing of a plurality of analog IF signals of different service bands of the Rx upstream analog IF signal.

4. The headend unit of claim 1, further comprising a remote power sending circuitry configured to send power to the remote service units through the Ethernet cable.

5. The headend unit of claim 1, further comprising an antenna power sending circuitry connected to the active antenna unit through a coaxial cable and configured to send power to the active antenna unit through the coaxial cable.

6. The headend unit of claim 1, further comprising a remote unit management circuitry configured to communicate with the multiple remote service units connected through the Ethernet cable and configured to perform a management function for the remote service units.

7. The headend unit of claim 1, wherein the downstream digital repeater circuitry comprises:
   an analog-to-digital conversion circuitry configured to receive Rx downstream analog IF signals obtained by frequency-division-multiplexing a plurality of IF signals of different service bands from the active antenna unit and convert the Rx downstream analog IF signals into digital downstream signals;
   a plurality of downstream digital bandpass filters configured to filter the digital downstream signals by service band and output a plurality of service-band-wise digital downstream signals;
   a plurality of downstream IF shifting circuitries configured to output digital downstream IF signals by frequency-shifting the service-band-wise digital downstream signals into signals in a Tx frequency range of the Ethernet cable; and
   a signal distributing circuitry configured to convert digital downstream IF signals output by a plurality of IF modulating circuitry into analog signals and distribute the analog signals into Ethernet ports.

8. The headend unit of claim 7, wherein the signal distributing circuitry comprises:

at least one frequency division multiplexing circuitry configured to frequency-division-multiplex two of the digital downstream IF signals output by the downstream IF shifting circuitry;
a first digital-to-analog conversion circuitry configured to convert the multiplexed digital downstream IF signals into analog signals and distribute the analog signals into a first wire pair of each Ethernet port; and
a second digital-to-analog conversion circuitry configured to convert the filtered service-band-wise digital downstream signals into analog signals and distribute the analog signals into a second wire pair of each Ethernet port.

9. The headend unit of claim 7, wherein the adder circuitry comprises:
a first adder circuitry configured to add an analog IF signal input from the first wire pair of the first Ethernet port and an analog IF signal output from the first wire pair of the second Ethernet port; and
a second adder circuitry configured to add an Rx upstream analog IF signal input from the second wire pair of the first Ethernet port and an Rx upstream analog IF signal input from the second wire pair of the second Ethernet port.

10. The headend unit of claim 9, wherein the upstream digital repeater circuitry comprises:
a first analog-to-digital conversion circuitry configured to convert an output of the first adder circuitry into a digital upstream signal;
a second analog-to-digital conversion circuitry configured to convert an output of the second adder circuitry into a digital upstream signal; and
a third analog-to-digital conversion circuitry configured to convert an output of a third adder circuitry into a digital upstream signal.

11. The headend unit of claim 10, wherein the upstream digital repeater circuitry comprises:
a first digital bandpass filter configured to filter an output of the first analog-to-digital conversion circuitry in a first service band; and
a second digital bandpass filter configured to filter an output of the first analog-to-digital conversion circuitry in a second service band.

12. The headend unit of claim 1, wherein the upstream digital repeater circuitry comprises:
an analog-to-digital conversion circuitry configured to convert the Rx upstream analog IF signal output by the adder circuitry into digital upstream signals;
a plurality of upstream digital bandpass filters configured to filter the digital upstream signals by service band;
a plurality of upstream IF shifting circuitry configured to frequency-shift the service-band-wise digital upstream signals into signals in a Tx frequency band of a coaxial cable and output digital upstream IF signals;
a multiplexing circuitry configured to output a single digital upstream IF signal by frequency-division-multiplexing the service-band-wise digital upstream IF signals; and
a digital-to-analog conversion circuitry configured to convert the frequency-division-multiplexed digital upstream signal into an analog signal and output the analog signal to the active antenna unit.

13. An in-building distributed repeater system comprising:
an active antenna unit configured to frequency-division-multiplex, amplify, and transmit analog intermediate frequency (IF) signals obtained by frequency-shifting wireless mobile communication signals of a plurality of service bands received from a plurality of mobile communication base stations, frequency-shift received frequency-division-multiplexed analog IF signals by service band, and transmit service-band-wise wireless mobile communication signals to the plurality of mobile communication base stations;
a remote service unit configured to transmit analog IF signals obtained by frequency-shifting wireless mobile communication signals of a plurality of service bands received from a mobile communication terminal, frequency-shift received analog IF signals by service band, and transmit service-band-wise wireless mobile communication signals; and
a headend unit comprising:
a downstream digital repeater circuitry connected to the active antenna unit, connected to the remote service unit through an Ethernet cable, and configured to perform digital signal processing on frequency-division-multiplexed analog IF signals input from the active antenna unit separately for each service band and distribute the signals to remote service units;
an adder circuitry configured to add up analog IF signals received from multiple remote service units; and
an upstream digital repeater circuitry configured to output one Tx upstream analog IF signal generated by performing digital signal processing for each service band on an output of the adder circuitry.

14. The in-building distributed repeater system of claim 13, wherein the active antenna unit frequency-shifts the received wireless mobile communication signals of the plurality of service bands into IF signals with adjacent frequency bands and transmits an analog IF signal with a compressed bandwidth through frequency division multiplexing.

15. The in-building distributed repeater system of claim 13, wherein the downstream digital repeater circuitry of the headend unit divisionally distributes a plurality of analog IF signals processed separately for each service band through wire pairs of each Ethernet cable.

16. The in-building distributed repeater system of claim 13, wherein the headend unit sends power to the remote service unit through the Ethernet cable.

17. The in-building distributed repeater system of claim 13, wherein the headend unit is connected to the active antenna unit through a coaxial cable and is configured to send power to the active antenna unit through the coaxial cable.

18. The in-building distributed repeater system of claim 13, wherein the headend unit further comprises a remote unit management unit configured to perform a terminal management function in communication with multiple remote service units connected through the Ethernet cables.

* * * * *